United States Patent
Randolph

(12)
(10) Patent No.: US 6,183,357 B1
(45) Date of Patent: Feb. 6, 2001

(54) AUTOMATED FISH SCALING APPARATUS

(76) Inventor: Kurtys E. Randolph, 130 Litton Ave., Groton, CT (US) 06340

(*) Notice: Under 35 U.S.C. 154(b), the term of this patent shall be extended for 0 days.

(21) Appl. No.: 09/484,467

(22) Filed: Jan. 14, 2000

(51) Int. Cl.[7] .................................................. A22C 25/02
(52) U.S. Cl. ........................................................... 452/98
(58) Field of Search ................................................ 452/98

(56) References Cited

U.S. PATENT DOCUMENTS

| | | |
|---|---|---|
| D. 366,594 | 1/1996 | Ousley . |
| 541,992 * | 7/1895 | Cloud et al. ............... 452/98 |
| 867,182 * | 9/1907 | Bahde ......................... 452/98 |
| 1,328,148 * | 1/1920 | Grayson ...................... 452/98 |
| 1,982,084 | 11/1934 | Strand . |
| 2,279,685 | 4/1942 | Kaplan . |
| 4,839,942 | 6/1989 | Damp . |
| 5,129,855 | 7/1992 | Bruckert et al. . |
| 5,318,472 | 6/1994 | Johnson . |

FOREIGN PATENT DOCUMENTS

| | | | |
|---|---|---|---|
| 835734 * | 3/1970 | (CA) ........................... | 452/98 |
| 153568 * | 1/1982 | (DE) ........................... | 452/98 |
| 320161 * | 11/1982 | (DE) ........................... | 452/98 |

* cited by examiner

Primary Examiner—Willis Little

(57) ABSTRACT

A automated fish scaling apparatus for scaling fish on a conveyor belt. The automated fish scaling apparatus includes a housing having a top wall, a first end and second end. A platform. having a bottom surface, a first end and a second end, is hingedly connected to the second end of the housing. A first continuous belt is adapted to carry a fish along a length of the top wall of the housing. A second continuous belt adapted to guide fish is rotatably coupled to a bottom surface of the platform. A first motor rotates the first continuous belt. A first blade for scaling the fish is fixedly mounted on the top wall of the housing. The first blade is located generally adjacent to the second end the housing. A second blade for scaling the fish is fixedly mounted to the bottom surface of the platform. The second blade is located generally adjacent to the second end of the platform.

11 Claims, 2 Drawing Sheets

AUTOMATED FISH SCALING APPARATUS

BACKGROUND OF THE INVENTION

1. Field of the Invention

The present invention relates to fish scaling devices and more particularly pertains to a new automated fish scaling apparatus for scaling fish on a conveyor belt.

2. Description of the Prior Art

The use of fish scaling devices is known in the prior art. More specifically, fish scaling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,318,472; 5,129,855; 2,279,685; 4,839,942; 1,982,084; and U.S. Des. Pat. No. 366,594.

While these devices fulfill their respective, particular objectives and requirements, the aforementioned patents do not a housing having a top wall, a first end and second end. A platform. having a bottom surface, a first end and a second end, is hingedly connected to the second end of the housing. A first continuous belt is adapted to carry a fish along a length of the top wall of the housing. A second continuous belt adapted to guide fish is rotatably coupled to a bottom surface of the platform. A first motor rotates the first continuous belt. A first blade for scaling the fish is fixedly mounted on the top wall of the housing. The first blade is located generally adjacent to the second end the housing. A second blade for scaling the fish is fixedly mounted to the bottom surface of the platform. The second blade is located generally adjacent to the second end of the platform.

In these respects, the automated fish scaling apparatus according to the present invention substantially departs from the conventional concepts and designs of the prior art, and in so doing provides an apparatus primarily developed for the purpose of scaling fish on a conveyor belt.

SUMMARY OF THE INVENTION

In view of the foregoing disadvantages inherent in the known types of fish scaling devices now present in the prior art, the present invention provides a new automated fish scaling apparatus construction wherein the same can be utilized for scaling fish on a conveyor belt.

The general purpose of the present invention, which will be described subsequently in greater detail, is to provide a new automated fish scaling apparatus apparatus and method which has many of the advantages of the fish scaling devices mentioned heretofore and many novel features that result in a new automated fish scaling apparatus which is not anticipated, rendered obvious, suggested, or even implied by any of the prior art fish scaling devices, either alone or in any combination thereof.

To attain this, the present invention generally comprises a housing having a top wall, a first end and second end. A platform. having a bottom surface, a first end and a second end, is hingedly connected to the second end of the housing. A first continuous belt is adapted to carry a fish along a length of the top wall of the housing. A second continuous belt adapted to guide fish is rotatably coupled to a bottom surface of the platform. A first motor rotates the first continuous belt. A first blade for scaling the fish is fixedly mounted on the top wall of the housing. The first blade is located generally adjacent to the second end the housing. A second blade for scaling the fish is fixedly mounted to the bottom surface of the platform. The second blade is located generally adjacent to the second end of the platform.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automated fish scaling apparatus apparatus and method which has many of the advantages of the fish scaling devices mentioned heretofore and many novel features that result in a new automated fish scaling apparatus which is not anticipated, rendered obvious, suggested, or even implied by any of the prior art fish scaling devices, either alone or in any combination thereof.

It is another object of the present invention to provide a new automated fish scaling apparatus which may be easily and efficiently manufactured and marketed.

It is a further object of the present invention to provide a new automated fish scaling apparatus which is of a durable and reliable construction.

An even further object of the present invention is to provide a new automated fish scaling apparatus which is susceptible of a low cost of manufacture with regard to both materials and labor, and which accordingly is then susceptible of low prices of sale to the consuming public, thereby making such automated fish scaling apparatus economically available to the buying public.

Still yet another object of the present invention is to provide a new automated fish scaling apparatus which provides in the apparatuses and methods of the prior art some of the advantages thereof, while simultaneously overcoming some of the disadvantages normally associated therewith.

Still another object of the present invention is to provide a new automated fish scaling apparatus for scaling fish on a conveyor belt.

Yet another object of the present invention is to provide a new automated fish scaling apparatus which includes a housing having a top wall, a first end and second end. A platform. having a bottom surface, a first end and a second end, is hingedly connected to the second end of the housing. A first continuous belt is adapted to carry a fish along a length of the top wall of the housing. A second continuous belt adapted to guide fish is rotatably coupled to a bottom surface of the platform. A first motor rotates the first continuous belt. A first blade for scaling the fish is fixedly mounted on the top wall of the housing. The first blade is located generally adjacent to the second end the housing. A second blade for scaling the fish is fixedly mounted to the bottom surface of the platform. The second blade is located generally adjacent to the second end of the platform.

Still yet another object of the present invention is to provide a new automated fish scaling apparatus that allows the user to scale fish and collect the scales in a quick and efficient manner.

Even still another object of the present invention is to provide a new automated fish scaling apparatus that contains a chopping block and blade for cutting heads and tails of the fish off.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
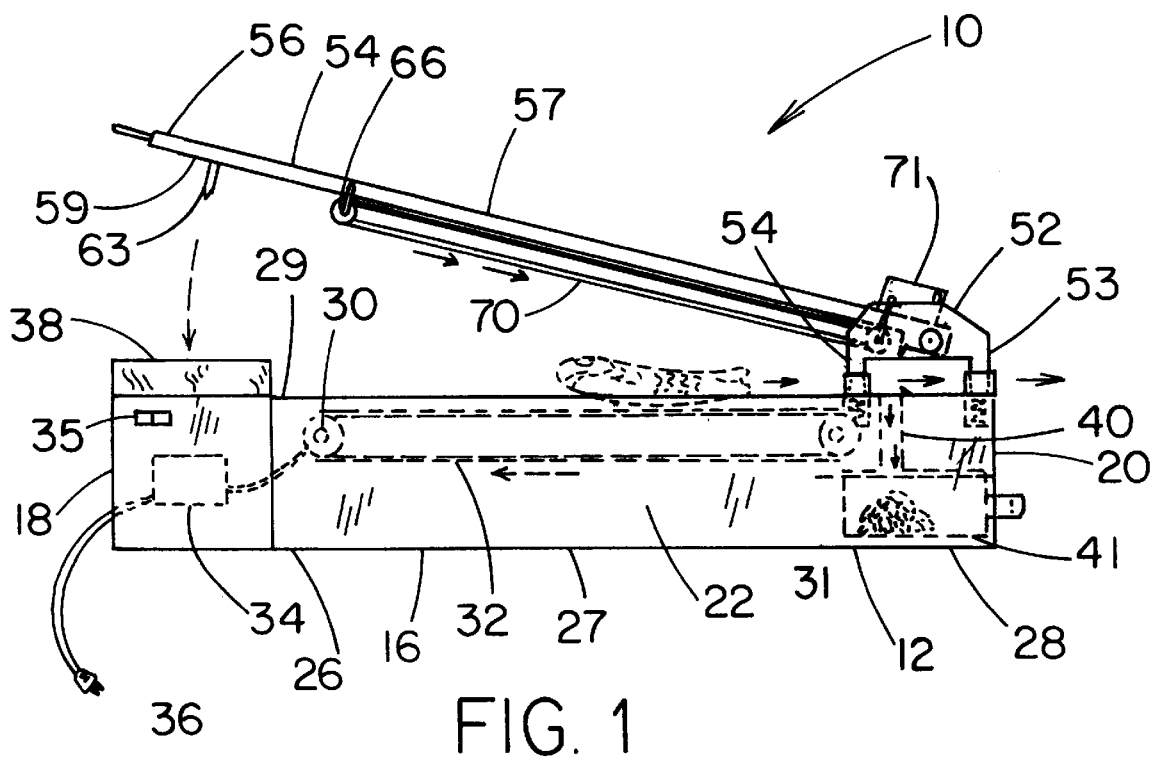
FIG. 1 is a schematic side view of a new automated fish scaling apparatus according to the present invention.
Figure 2:
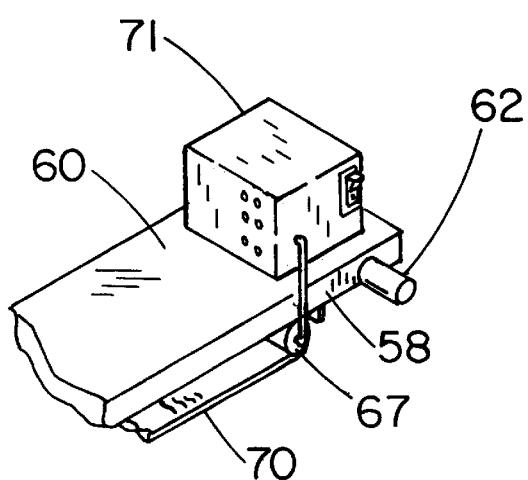
FIG. 2 is a schematic perspective view of the proximal portion of the platform of the present invention.
Figure 3:
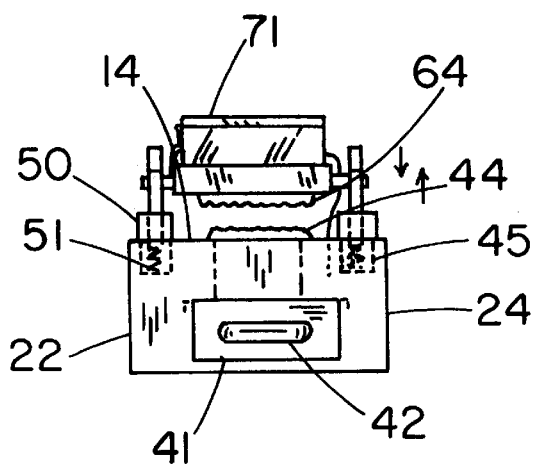
FIG. 3 is a schematic end view of the present invention.
Figure 4:
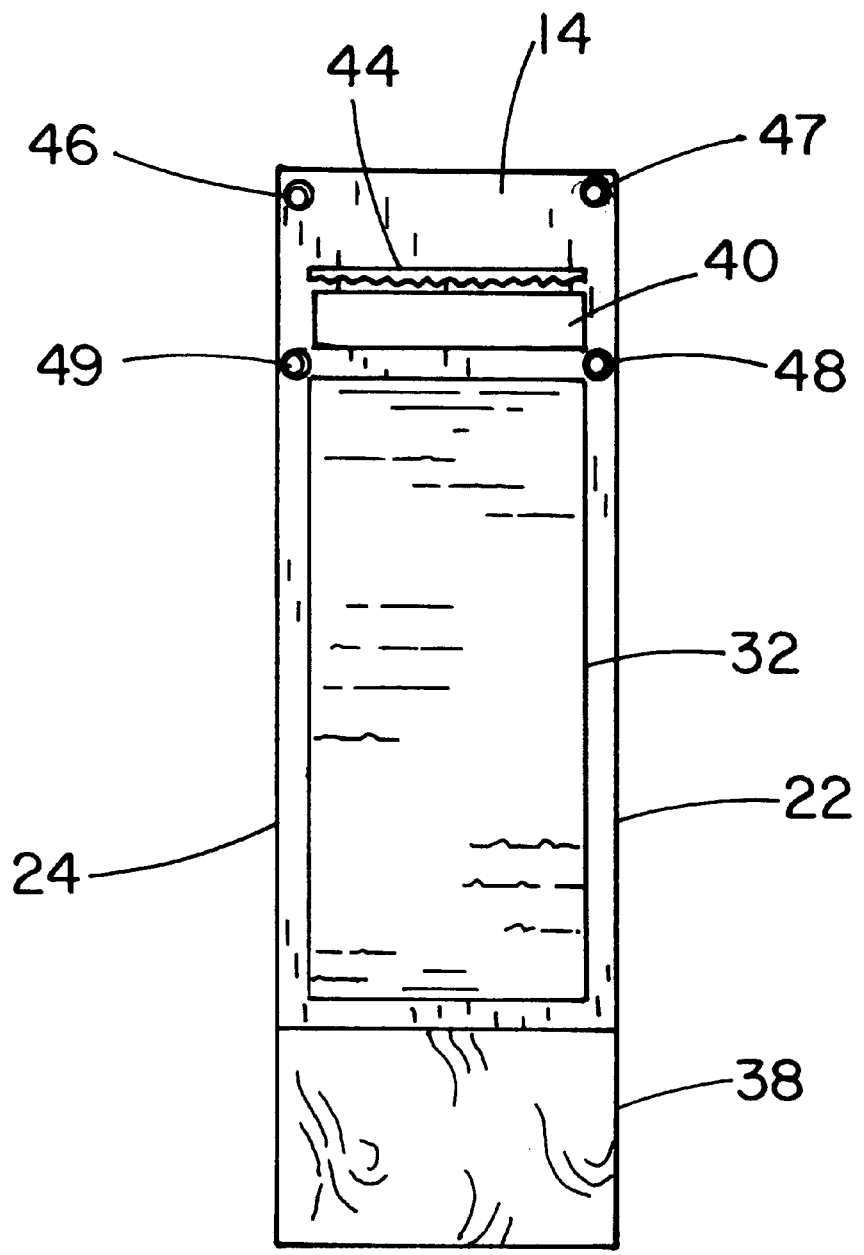
FIG. 4 is a schematic plan view of the housing of the present invention.

With reference now to the drawings, and in particular to FIGS. 1 through 4 thereof, a new automated fish scaling apparatus embodying the principles and concepts of the present invention and generally designated by the reference numeral 10 will be described.

As best illustrated in FIGS. 1 through 4, the automated fish scaling apparatus 10 generally comprises a housing 12. The housing 12 has a top wall 14, a bottom wall 16, a first wall 18, a second wall 20, a third wall 22 and a fourth wall 24. The first 18 and second walls 20 are opposing walls, and the third 22 and fourth walls 24 are opposing walls. The housing 12 has a distal portion 26, a central portion 27 and a proximal portion 28. The central portion 27 of the top wall 14 is open. The housing has a top peripheral edge 29. The housing has a generally rectangular shape. Preferably, a length of the first 18 and second 20 opposing walls is shorter than a length of the third 22 and fourth 24 opposing walls.

A first pulley 30 is rotatably mounted in the housing 12. The first pulley 30 is mounted between the third 22 and fourth walls 24. The first pulley 30 is located generally adjacent to the top 29 peripheral edge and a juncture of the distal 26 and central 27 portions of the housing.

A second pulley 31 is rotatably mounted in the housing 12. The second pulley 31 extends between the third 22 and fourth walls 24. The second pulley 31 is located generally adjacent to the top peripheral edge 29 and a juncture of the central 27 and proximal 28 portions of the housing.

A first continuous belt 32 for rotating on the pulleys extends between and wraps about the first 30 and second 31 pulleys. The belt 32 has a width substantially equal to a width of the opening in the top wall 14 of the housing 12.

A first motor rotates 34 the first pulley 30. The first motor 34 is mounted in the distal portion 26 of the housing 12. The first motor 34 is operationally coupled to the first pulley 30. The motor is ideally an electric motor.

A first switch 35 for actuates the first motor. The first switch 35 is electrically coupled to the first motor. The first switch 35 is mounted on the third wall 22. The first switch 35 is located generally adjacent to the motor 34.

A power cord 36 supplies power to the motor 34. The power cord 36 is electrically coupled to motor 34. The power cord 36 extends through the first wall of the housing 12.

A chopping block 38 for cutting a fish is mounted on the top wall 14. The chopping block is generally located on the distal portion 26 of the housing.

A slot 40 in the top wall 14 for allowing scales to fall into the housing 12 is located generally adjacent to a juncture of the central 27 and proximal portions 28.

A tray 41 for catching scales from a fish is slidably mounted in the second wall 20 of the housing. The tray 41 is located generally adjacent to the bottom wall 16 of the housing. The tray 41 has a handle 42 thereon.

A first blade 44 for scaling the fish is located generally adjacent to the slot 40 on the top wall 14 of the housing. The first blade 44 is located between the slot 40 and the second wall 20. The first blade is orientated generally perpendicular to the third 22 and fourth 24 walls.

Four bores 45 are in the top wall 14 of the housing 12. Each of the bores 45 is located in the proximal portion 28 of the housing. Each of the bores 45 is located generally adjacent to the top peripheral edge 29 of the housing. A first of the bores 46 is generally located in a corner created by the second and fourth walls. A second 47 of the bores is generally located in a corner created by the second and third walls. A third 48 of the bores is located generally adjacent to the third wall and between the slot 40 and the second pulley 31. A fourth 49 of the bores is located generally adjacent to the fourth wall and between the slot 40 and the second pulley 31.

Four tubes 50 are fixedly coupled to and extend upwardly away from one of the bores 45. Each of the tubes 50 is hollow and has a pair of open ends.

There are four springs 51. Each of the springs has a first end fixedly mounted within one of the bores 45.

A pair of mountings 52 each has a base and two legs 53, 54. Each of the mountings 52 has a generally inverted U-shape. The bases of the mountings have a bore therein. Each of the legs of one of the mountings is inserted in the first 46 and fourth 49 bores. Each of the legs of the other mounting is inserted in the second 47 and third 48 bores. The bores in the mountings 52 are oriented such that the bores are generally coaxial when the mountings are placed in the bores.

A platform 54 for guiding fish along the first belt 32 has a distal portion 56, a central portion 57 and a proximal portion 58. The platform has a bottom surface 59 and a top surface 60. The platform has a generally rectangular shape.

A bar 62 secures the platform 54 to the mountings 52. The bar 62 is fixedly secured to the proximal portion 58 of the platform 54. The bar 62 extends between and is rotatably coupled to each of the bores in the mountings 52. The platform 54 may be moved between and open and closed position with respect to the housing.

Preferably, a chopping blade 63 for cutting the fish is fixedly mounted to the bottom surface 59 of the platform 54. The chopping blade 63 is located on the distal portion 56 of the platform such that when the platform 54 is in the closed position the chopping blade 63 is brought against the chopping block 38.

A second blade 64 for scaling the fish is fixedly mounted to the bottom surface 59 of the platform 54. The second blade 64 is located such that when the platform is in the closed position the second blade 64 is located generally above the first blade 44. The second blade 64 is oriented generally parallel with the first blade 44 when the platform 54 is in the closed position.

A third pulley 66 is rotatably mounted on the bottom surface 59 of the platform 54. The third pulley 66 is generally located between the central 57 and distal portion 56 of the platform.

A fourth pulley 67 is rotatably mounted on the bottom surface 59 of the platform 54. The fourth pulley 67 is generally located between the central 57 and proximal portion 58 of the platform 54.

A second belt 70 for connecting the third 66 and fourth pulleys 67 extends between and is wrapped about the third and fourth pulleys.

A second motor 71 for rotating the fourth pulley is mounted on the top surface of the platform. The second motor is generally located in the proximal portion of the platform. The second motor is operationally coupled to the fourth pulley 67. Preferably, the second motor is an electric motor. The second motor is electrically coupled to the power cord.

A second switch, not shown, for actuating the second motor 71 is electrically coupled to the second motor. The first switch is mounted on the second motor. Alternatively, the first switch may be coupled to and actuate the second motor.

In use, a fish is placed on the first belt 32 and the platform 54 is lowered over it. The first and second switches are turned on which rotates the first 32 and second 70 belts. The platform rests on springs 51 which allows it to vary in distance from the housing 12 to accommodate larger fish. The first 44 and second 64 blades scrape the scales off of the fish which fall through the slot 40 and into the tray 41 for disposal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automated fish scaling apparatus, said apparatus comprising:

a housing, said housing having a top wall, a first end and second end;

a platform, said platform having a bottom surface, a first end and a second end, said second end of said platform being hingedly connected to said second end of said housing;

a first continuous belt adapted to carry a fish along a length of said top wall of said housing;

a second continues belt adapted to guide fish, said second continuous belt being rotatably coupled to a bottom surface of said platform;

a first motor for rotating said first continuous belt;

a first blade for scaling the fish, said first blade being fixedly mounted on said top wall of said housing, said first blade being located generally adjacent to said second end said housing; and a second blade for scaling the fish, said scaling blade being fixedly mounted to said bottom surface of said platform, said second blade being located generally adjacent to said second end of said platform.

2. The automated fish scaling apparatus as in claim 1, wherein said housing and said platform comprise:

said housing having a bottom wall, a first wall, a second wall, a third wall and a fourth wall, said first and second walls being opposing walls, said third and fourth walls being opposing walls, said first end of said housing being a distal portion, said housing having a central portion, said second end of said housing being a proximal portion, said central portion of said top wall being open, said housing having a top peripheral edge, said housing having a generally rectangular shape, a length of said first and second opposing walls being shorter than a length of said third and fourth opposing walls; and said first end of said platform being a distal portion, said platform having a central portion, said second end of said platform being a proximal portion, said platform having a a top surface, said platform having a generally rectangular shape.

3. The automated fish scaling apparatus as in claim 2, further comprising:

a first pulley, said first pulley being rotatably mounted in said housing, said first pulley being mounted between said third and fourth walls, said first pulley being located generally adjacent to said top peripheral edge and a juncture of said distal and central portions of said housing;

a second pulley, said second pulley being rotatably mounted in said housing, said second pulley extending between said third and fourth walls, said second pulley being located generally adjacent to said top peripheral edge and a juncture of said central and proximal portions of said housing;

said first continuous belt extending between and wrapping about said first and second pulleys.

4. The automated fish scaling apparatus as in claim 3, said first motor comprises:
   said first motor being mounted in said distal portion of said housing, said first motor being operationally coupled to said first pulley, said motor being an electric motor.

5. The automated fish scaling apparatus as in claim 1, further comprising:
   a first switch for actuating said first motor, said first switch being electrically coupled to said first motor, said first switch being mounted on said third wall, said first switch being located generally adjacent to said motor;
   a power cord for supplying power to said motor, said power cord being electrically coupled to motor, said power cord extending through said a wall of said housing.

6. The automated fish scaling apparatus as in claim 2, further comprising:
   a chopping block for cutting a fish, said chopping block being mounted on said top wall, said chopping block being generally located on said distal portion of said housing; and
   a chopping blade for cutting the fish, said chopping blade being fixedly mounted to said bottom surface of said platform, said chopping blade being located on said distal portion of said platform such that when said platform is in said closed position said chopping blade is brought against said chopping block.

7. The automated fish scaling apparatus as in claim 2, further comprising:
   a slot in said top wall for allowing scales to fall into said housing, said slot being located generally adjacent to a juncture of said central and proximal portions;
   a tray for catching scales from a fish, said tray being slidably mounted in said second wall of said housing, said tray being located generally adjacent to said bottom wall of said housing, said tray having a handle thereon;
   wherein said first blade is located generally adjacent to said slot, said first blade being orientated generally perpendicular to said third and fourth walls.

8. The automated fish scaling apparatus as in claim 2, further comprising:
   four bores in said top wall of said housing, each of said bores being located in said proximal portion of said housing, each of said bores being located generally adjacent to said top peripheral edge of said housing;
   four tubes, each of said tubes being fixedly coupled to and extending upwardly away from one of said bores, each of said tubes being hollow and having a pair of open ends;
   four springs, each of said springs having a first end being fixedly mounted within one of said bores;
   a pair of mountings, each of said mountings having a base and two legs, each of said mountings having a generally inverted U-shape, each of said bases of said mounting having a bore therein, said legs of one of said mountings being inserted in said first and fourth bores, said legs of one of said mounting being inserted in said second and third bores, said bores in said mounting being oriented such that said bores are generally coaxial when said mountings are placed in said bores; and
   a bar for securing said platform to said mounting, said bar being fixedly secured to said proximal portion of said platform, said bar extending between and being rotatably coupled to each of said bores in said mountings, said platform may be moved between and open and closed position with respect to said housing.

9. The automated fish scaling apparatus as in claim 2, further comprising:
   a third pulley, said third pulley being rotatably mounted on said bottom surface of said platform, said third pulley being generally located between said central and distal portion of said platform;
   a fourth pulley, said fourth pulley being rotatably mounted on said bottom surface of said platform, said fourth pulley being generally located between said central and proximal portion of said platform; and
   said second belt extending between and being wrapped about said third and fourth pulleys.

10. The automated fish scaling apparatus as in claim 9, further comprising:
    a second motor for rotating said fourth pulley, said second motor being mounted on said top surface of said platform, said second motor being operationally coupled to said fourth pulley, said second motor being an electric motor, said second motor being electrically coupled to a power cord; and
    a second switch for actuating said second motor, said second switch being electrically coupled to said second motor, said first switch being mounted on said second motor.

11. An automated fish scaling apparatus, said apparatus comprising:
    a housing, said housing having a top wall, a bottom wall, a first wall, a second wall, a third wall and a fourth wall, said first and second walls being opposing walls, said third and fourth walls being opposing walls, said housing having a distal portion, a central portion and a proximal portion, said central portion of said top wall being open, said housing having a top peripheral edge, said housing having a generally rectangular shape, a length of said first and second opposing walls being shorter than a length of said third and fourth opposing walls;
    a first pulley, said first pulley being rotatably mounted in said housing, said first pulley being mounted between said third and fourth walls, said first pulley being located generally adjacent to said top peripheral edge and a juncture of said distal and central portions of said housing;
    a second pulley, said second pulley being rotatably mounted in said housing, said second pulley extending between said third and fourth walls, said second pulley being located generally adjacent to said top peripheral edge and a juncture of said central and proximal portions of said housing;
    a first continuous belt for rotating on said pulleys, said belt extending between and wrapping about said first and second pulleys, said belt having a width substantially equal to a width of said opening in said top wall of said housing;
    a first motor for rotating said first pulley, said first motor being mounted in said distal portion of said housing, said first motor being operationally coupled to said first pulley, said motor being an electric motor;
    a first switch for actuating said first motor, said first switch being electrically coupled to said first motor, said first switch being mounted on said third wall, said first switch being located generally adjacent to said motor;

a power cord for supplying power to said motor, said power cord being electrically coupled to motor, said power cord extending through said first wall of said housing;

a chopping block for cutting a fish, said chopping block being mounted on said top wall, said chopping block being generally located on said distal portion of said housing;

a slot in said top wall for allowing scales to fall into said housing, said slot being located generally adjacent to a juncture of said central and proximal portions;

a tray for catching scales from a fish, said tray being slidably mounted in said second wall of said housing, said tray being located generally adjacent to said bottom wall of said housing, said tray having a handle thereon;

a first blade for scaling the fish, said first blade being located generally adjacent to said slot, said first blade being located between said slot and said second wall, said first blade being orientated generally perpendicular to said third and fourth walls;

four bores, said bores being in said top wall of said housing, each of said bores being located in said proximal portion of said housing, each of said bores being located generally adjacent to said top peripheral edge of said housing, a first of said bores being generally located in a corner created by said second and fourth walls, a second of said bores being generally located in a corner created by said second and third walls, a third of said bores being located generally adjacent to said third wall and between said slot and said second pulley, a fourth of said bores being located generally adjacent to said fourth wall and between said slot and said second pulley;

four tubes, each of said tubes being fixedly coupled to and extending upwardly away from one of said bores, each of said tubes being hollow and having a pair of open ends;

four springs, each of said springs having a first end being fixedly mounted within one of said bores;

a pair of mountings, each of said mountings having a base and two legs, each of said mountings having a generally inverted U-shape, each of said bases of said mounting having a bore therein, said legs of one of said mountings being inserted in said first and fourth bores, said legs of one of said mounting being inserted in said second and third bores, said bores in said mounting being oriented such that said bores are generally coaxial when said mountings are placed in said bores;

a platform for guiding fish along said first belt, said platform having a distal portion, a central portion and a proximal portion, said platform having a bottom surface and a top surface, said platform having a generally rectangular shape;

a bar for securing said platform to said mounting, said bar being fixedly secured to said proximal portion of said platform, said bar extending between and being rotatably coupled to each of said bores in said mountings, said platform may be moved between and open and closed position with respect to said housing;

a chopping blade for cutting the fish, said chopping blade being fixedly mounted to said bottom surface of said platform, said chopping blade being located on said distal portion of said platform such that when said platform is in said closed position said chopping blade is brought against said chopping block;

a second blade for scaling the fish, said scaling blade being fixedly mounted to said bottom surface of said platform, said second blade being located such that when said platform is in said closed position said second blade located generally above said first blade, said second blade being oriented generally parallel with said first blade when said platform being in said closed position;

a third pulley, said third pulley being rotatably mounted on said bottom surface of said platform, said third pulley being generally located between said central and distal portion of said platform;

a fourth pulley, said fourth pulley being rotatably mounted on said bottom surface of said platform, said fourth pulley being generally located between said central and proximal portion of said platform;

a second belt for connecting said third and fourth pulleys, said second belt extending between and being wrapped about said third and fourth pulleys;

a second motor for rotating said fourth pulley, said second motor being mounted on said top surface of said platform, said second motor being generally located in said proximal portion of said platform, said second motor being operationally coupled to said fourth pulley, said second motor being an electric motor, said second motor being electrically coupled to said power cord; and a second switch for actuating said second motor, said second switch being electrically coupled to said second motor, said first switch being mounted on said second motor.

* * * * *